United States Patent
Wang et al.

(10) Patent No.: US 9,965,021 B2
(45) Date of Patent: May 8, 2018

(54) METHOD AND SYSTEM PROVIDING POWER MANAGEMENT FOR MULTIMEDIA PROCESSING

(71) Applicant: MediaTek Inc., Hsinchu (TW)

(72) Inventors: Chih-Ming Wang, Zhubei (TW); Yung-Chang Chang, New Taipei (TW)

(73) Assignee: MediaTek, Inc., Hsinchu (TW)

( * ) Notice: Subject to any disclaimer, the term of this patent is extended or adjusted under 35 U.S.C. 154(b) by 34 days.

(21) Appl. No.: 14/745,509

(22) Filed: Jun. 22, 2015

(65) Prior Publication Data

US 2015/0370306 A1  Dec. 24, 2015

Related U.S. Application Data (60) Provisional application No. 62/015,690, filed on Jun. 23, 2014.

(51) Int. Cl.
  *G06F 1/32* (2006.01)
(52) U.S. Cl.
  CPC .......... *G06F 1/3287* (2013.01); *G06F 1/3206* (2013.01); *Y02B 60/1282* (2013.01); *Y02B 60/32* (2013.01)
(58) Field of Classification Search
  CPC .. G06F 15/7803; G06F 1/3228; G06F 1/3265; G06F 1/3287; G06F 1/3234; G06K 9/6212; G06K 9/00993
  USPC ................................................ 713/320, 323
  See application file for complete search history.

(56) References Cited

U.S. PATENT DOCUMENTS

| | | | | |
|---|---|---|---|---|
| 7,318,164 | B2* | 1/2008 | Rawson, III | G06F 1/3228 713/320 |
| 2007/0133688 | A1* | 6/2007 | Tjandrasuwita | H04N 19/61 375/240.21 |
| 2007/0133692 | A1* | 6/2007 | Reddy | H04N 19/61 375/240.25 |
| 2008/0133954 | A1* | 6/2008 | Fallah | G06F 1/3203 713/323 |
| 2008/0276140 | A1* | 11/2008 | Gemmeke | G01B 31/318575 714/726 |
| 2009/0204835 | A1* | 8/2009 | Smith | G06F 1/3203 713/323 |
| 2011/0234297 | A1* | 9/2011 | Fukuoka | H03K 19/0016 327/427 |
| 2011/0264902 | A1 | 10/2011 | Hollingworth | |

(Continued)

FOREIGN PATENT DOCUMENTS

| | | |
|---|---|---|
| CN | 101251766 A | 8/2008 |
| CN | 102520782 A | 6/2012 |

*Primary Examiner* — Thomas Lee
*Assistant Examiner* — Santosh R Poudel
(74) *Attorney, Agent, or Firm* — The Law Office of Tong Lee (57) ABSTRACT

A power management method is provided to detect system information for a multimedia process, which is to be executed in a multimedia processor system that includes a plurality of cores belonging to a plurality of power domains. The power domains are controlled independently of one another. The method further identifies a set of power domains that provides a processing capacity matching a requirement of the multimedia process indicated in the system information, and supplies power to one or more of the power domains according to the identified set of power domains.

22 Claims, 11 Drawing Sheets

(56) References Cited

U.S. PATENT DOCUMENTS

| | | | | |
|---|---|---|---|---|
| 2012/0210142 A1* | 8/2012 | Ichiki | .................... | G06F 1/3209 |
| | | | | 713/300 |
| 2012/0240125 A1* | 9/2012 | Danko | ...................... | G06F 9/50 |
| | | | | 718/104 |
| 2012/0250755 A1* | 10/2012 | Ratner | ................. | H04N 19/436 |
| | | | | 375/240.01 |
| 2014/0046898 A1* | 2/2014 | Smith | ................... | G06F 17/303 |
| | | | | 707/609 |
| 2014/0173312 A1* | 6/2014 | Shippy | ................. | G06F 9/5094 |
| | | | | 713/323 |
| 2014/0368688 A1* | 12/2014 | John Archibald | . | H04N 5/23241 |
| | | | | 348/222.1 |
| 2015/0033047 A1* | 1/2015 | Byun | .................... | G06F 1/3206 |
| | | | | 713/320 |

* cited by examiner

METHOD AND SYSTEM PROVIDING POWER MANAGEMENT FOR MULTIMEDIA PROCESSING

CROSS-REFERENCE TO RELATED APPLICATIONS

This application claims the benefit of U.S. Provisional Application No. 62/015,690 filed on Jun. 23, 2014.

TECHNICAL FIELD

Embodiments of the invention relate to power management, and more specifically, to a method and system providing power management for multimedia processing.

BACKGROUND

Figure 1:
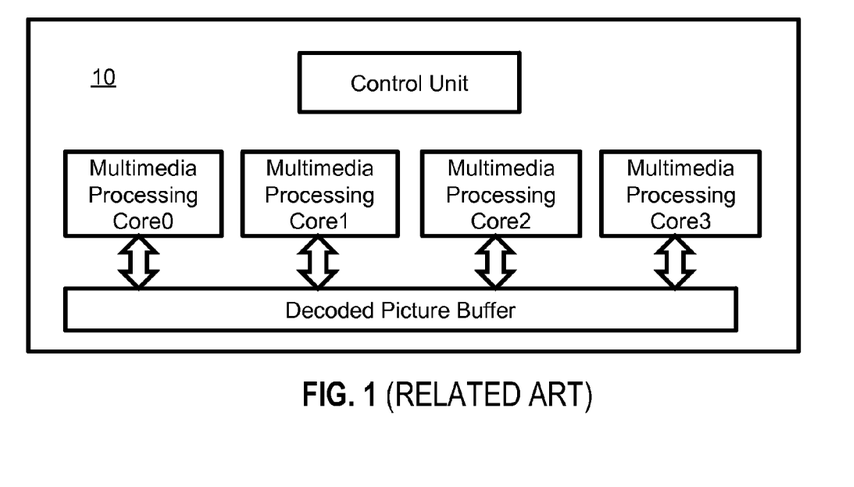
FIG. 1 illustrates an example of a quad-core multimedia processing system.
Figure 2:
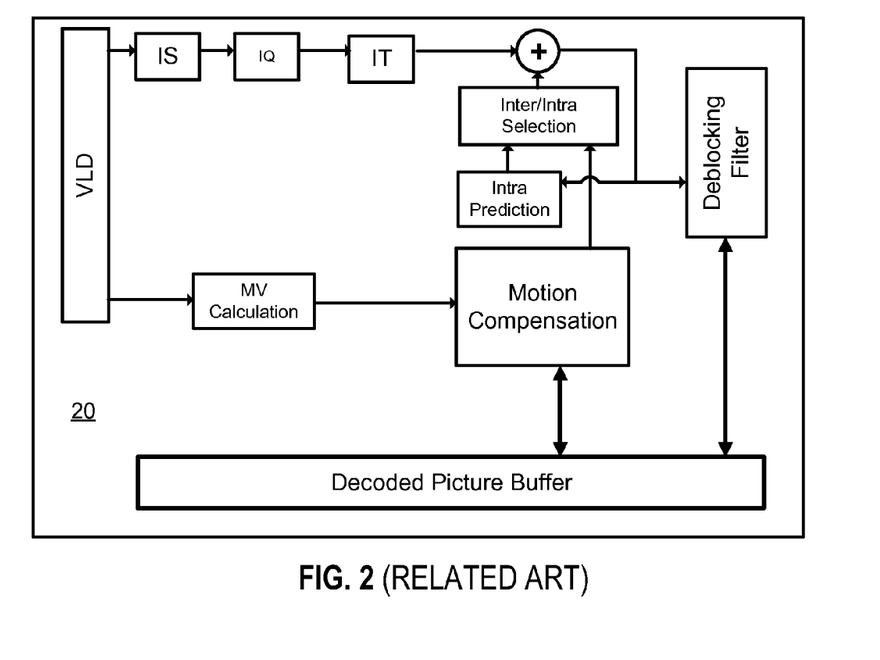
FIG. 2 illustrates an example of a video decoder core.

Low-energy multimedia processing is growing in importance given the demands of current and emerging mobile devices. Devices such as smart phones, tablets, and other handheld devices are often expected to integrate increasingly advanced technologies that require higher performance levels. In order to accommodate these requirements, processors have now commonly adopted multi-core architectures for performing various multimedia processes such as video decoding, video encoding, and image signal processing, amongst others. An example of a multi-core multimedia processing system 10 is shown in FIG. 1. An example of one of the multimedia cores of FIG. 1 is a video decoder (VDEC) core 20, such as that shown in FIG. 2.

Along with these high-performance architectures, however, the maintenance of low power usage and long battery life has become critical for controlling power and thermal issues. The majority of power consumed by a system-on-a-chip (SoC) circuitry is comprised of dynamic power ($\alpha CV_{DD}^2 F$) and leakage power ($V_{DD}I_{LEAK}$), where $\alpha$=activity factor, C=capacitance, $V_{DD}$=supply voltage, F=clock frequency, and $I_{LEAK}$=leakage current. As transistor sizes scale down and levels of integration increase, leakage power has become a dominant problem in modern low-power system designs.

An approach is needed for a low-power system design that can effectively reduce power consumption in the context of multimedia processing.

SUMMARY

In one embodiment, a method of power management is provided for multimedia processing. The method comprises detecting system information for a multimedia process, which is to be executed in a multimedia processor system that includes a plurality of cores belonging to a plurality of power domains, wherein the power domains are controlled independently of one another. The method further comprises identifying a set of the power domains that provides a processing capacity matching a requirement of the multimedia process indicated in the system information; and supplying power to one or more of the power domains according to the identified set of the power domains.

In another embodiment, a system that manages power for multimedia processing is provided. The system comprises a multimedia processor system that includes a plurality of cores belonging to a plurality of power domains, wherein the power domains are controlled independently of one another; power domain controllers, each of which controls one of the power domains; and a system controller coupled to the multimedia processor system. The system controller is operative to: detect system information for a multimedia process, which is to be executed in the multimedia processor system; identify a set of power domains that provides a processing capacity matching a requirement of the multimedia process indicated in the system informations; and direct the power domain controls to supply power to one or more of the power domains according to the identified set of the power domains.

In yet another embodiment, a method of power management is provided for multimedia processing. The method comprises: detecting system information for a multimedia process, which is to be executed in a multimedia processor system that includes a first set of one or more cores and a second set of one or more cores, wherein the first set belongs to at least one power domain, and the second set does not belong to the at least one power domain; determining whether the second set provides a processing capacity matching a requirement of the multimedia process indicated in the system information; and supplying power to the at least one power domain in response to a determination that the second set does not provide the processing capacity.

In yet another embodiment, a system that manages power for multimedia processing is provided. The system comprises a multimedia processor system that includes a first set of one or more cores and a second set of one or more cores, wherein the first set belongs to at least one power domain, and the second set does not belong to the at least one power domain; at least one power domain control which controls the at least one power domain. The system further comprises a system controller coupled to the multimedia processor system. The system controller is operative to: detect system information for a multimedia process, which is to be executed in the multimedia processor system; determine whether the second set provides a processing capacity matching a requirement of the multimedia process indicated in the system information; and direct the at least one power domain control to supply power to the at least one power domain in response to a determination that the second set does not provide the processing capacity.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a method and system that manage power for multimedia processing. An embodiment of the invention includes a multimedia processor system, with a plurality of cores, coupled with a system controller operative to perform a method of power management.

In one embodiment, the cores belong to a plurality of power domains controlled independently of one another. As an example, if the multimedia processor system includes N cores, each of the power domains may include M cores, where M is between 1 and N−1. The M cores of a single power domain share a single power control circuit. Thus, the shutoff of power to one power domain results in the shutoff of power to all M cores within that power domain. Simultaneously and independently, power may be supplied or cut off to another power domain. In addition, a single core may belong to one or more power domains.

In one embodiment, the system controller performs a power management method to determine, based on one or more factors, whether power should be supplied to one or more of the power domains. In an embodiment of the power management method, such factors may include one or more types of system information for or related to a multimedia process that has been, is being, or will be performed in the multimedia processor system. In one embodiment, the system information indicates a requirement of the multimedia process. The power management method includes identifying one or more power domains that provide the processing capacity matching the requirement of the multimedia process. The identified one or more power domains are activated, and the remaining power domains can be de-activated. In some embodiments, the system information may be used by the system controller to estimate the time for performing the multimedia process. In some embodiments, the system information may pertain to an operating condition of the multimedia processor system, such as temperature, power and current, or may pertain to a hardware configuration of the multimedia processor system, such as chip bonding information. In some embodiments of the power management method, the system information, or the requirement, estimation, condition, configuration derived therefrom, may be compared to a pre-determined threshold in making the power control determination.

As used herein, activating a power domain means that power is supplied to the power domain to support active operation of the cores therein. De-activating a power domain means that power is shutoff or cutoff from the power domain to reduce unnecessary power consumption; e.g., leakage current. A power gating technique may be used to de-activate a power domain. In one embodiment, each power domain is power gated by a multi-threshold CMOS (MTC-MOS) circuitry.

The method and system described herein provide fine-grained power management and control for multimedia processes including, but not limited to, video decoding, video encoding, audio decoding, audio encoding and image signal processing.

Figure 3:
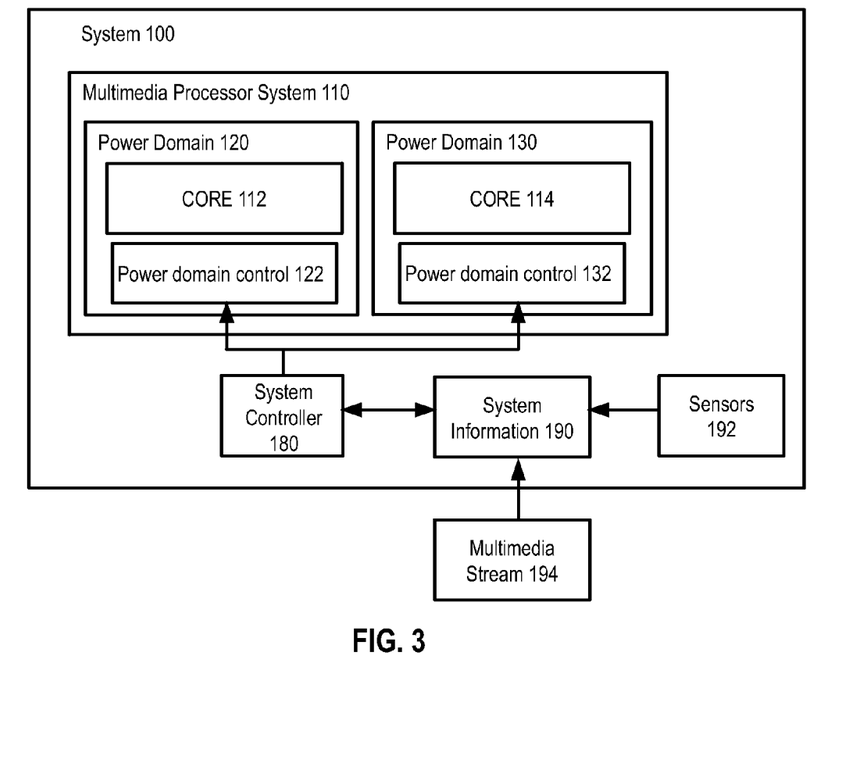
FIG. 3 illustrates a system providing power management for multimedia processing according to one embodiment.

FIG. 3 illustrates a system 100 in which power management for a multimedia process is provided, according to one embodiment of the invention. System 100 may be operative to provide one or more functions, such as but not limited to computing, communication, and entertainment. System 100 includes a multimedia processor system 110 and a system controller 180. As shown, multimedia processor system 110 includes two power domains 120 and 130 and two processor cores (also referred to as "cores") 112 and 114. It is understood that multimedia processor system 110 may include any number of power domains and each power domain may include any number of cores. In the configuration shown in this embodiment, core 112 is within power domain 120, and core 114 within power domain 130. Thus, where N represents the total number of cores in a processor, and $M_i$ represents the number of cores within power domain i, in this embodiment N=2 and $M_{120}=M_{130}=1$.

In one embodiment, power domains 120 and 130 are controlled by power domain controls 122 and 132, respectively. Power domain controls 122 and 132 operate according to instructions, commands or signals from system controller 180. System controller 180, in turn, generates the instructions, commands or signals based on system information 190. System controller 180 includes hardware, software, or a combination of both. In one embodiment, system controller 180 is a general-purpose processor, such as a central processing unit (CPU) or a Reduced-Instruction Set Computing (RISC) processor. Alternatively, system controller 180 may be a special-purpose controller. System information 190 may be input from outside system 100, or accessed from within system 100.

Power domain controls 122 and 132, as directed by the system controller 180, may supply or shut off power to their respective power domains 120 and 130, depending on various factors or circumstances. Such factors and circumstances may be determined based on system information 190, which may include information related to the multimedia processing being performed, and may be retrieved or extracted by system controller 180. As an example, system information 190 may include one or more of the following information types: resolution, frame rate, bit rate, video processing standard, estimated processing time, temperature measurements, power measurements, current measurements and chip bonding information. In some embodiments, the system information 190 may additionally or alternatively include audio sample rate and/or audio compression standard. Each of these information types may be used independently, or multiple information types may be used in combination for power management purpose.

In one embodiment, system information 190 may be generated or received by, or otherwise available from the system 100. For example, system information 190 may be received from sensors 192. Sensors 192 are operative to sense or measure one or more aspects of the system 100 or its operations, such as but not limited to power, current, temperature, or a combination of the above. Additionally or alternatively, system information 190 may be obtained by system controller 180 parsing the header of multimedia stream 194, which is received and processed by the system 100 and may include data such as but not limited to video, audio, image data, other various types of multimedia data, or a combination of the above. Although a specific type of multimedia stream may be used as an example in the description for simplicity, it is understood that the operations can be applied to any type of multimedia stream. System information 190 may also include one or more of various other types of information; e.g., hardware configuration information such as chip bonding information, which identifies a product segment to which the multimedia processor system belongs.

Once the system controller 180 detects system information 190, it identifies one or more power domains that provide the processing capability matching the requirement of the multimedia process. Unused or unnecessary processing capability of the multimedia processor system 110 is removed by deactivating one or more of the power domains. Based on the identified processing capacity, and additionally or alternatively another calculation or other determination, system controller 180 may instruct that the power to one or more of the power domains 120 and 130 be supplied or shut off, and may do so via an instruction or control signal to power domain control 122 or 132 respectively.

Figure 4:
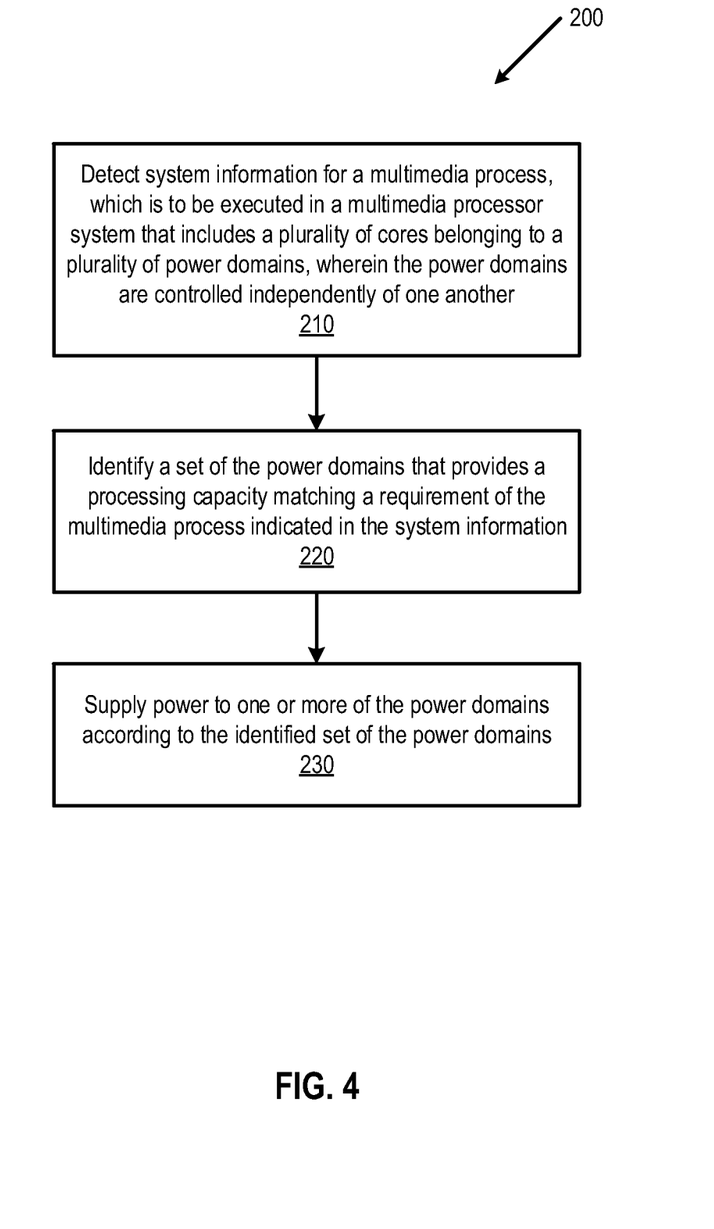
FIG. 4 is a flow diagram illustrating a power management method for multimedia processing according to one embodiment.

An embodiment of a power management method 200 is illustrated in the flow diagram of FIG. 4. At step 210, system information is detected for a multimedia process, which may be executed in a multimedia processor system that includes a plurality of cores belonging to a plurality of power domains, wherein the power domains are controlled independently of one another. At step 220, a set of the power domains that provides a processing capacity matching a requirement of the multimedia process is identified. In one embodiment, the set of the power domains may include one, multiple, or all of the power domains multimedia processor system. At step 230, power is supplied to one or more of the power domains according to the identified set of the power domains. In some instances, it may be desirable to loop back to step 210 or step 220, or to repeat step 230. The looping or repeating of steps may allow for the detection of new system information, identification of a new matching capacity, ongoing determination of whether one or more power domains should be turned on or off, or other preferred effects.

Figure 5:
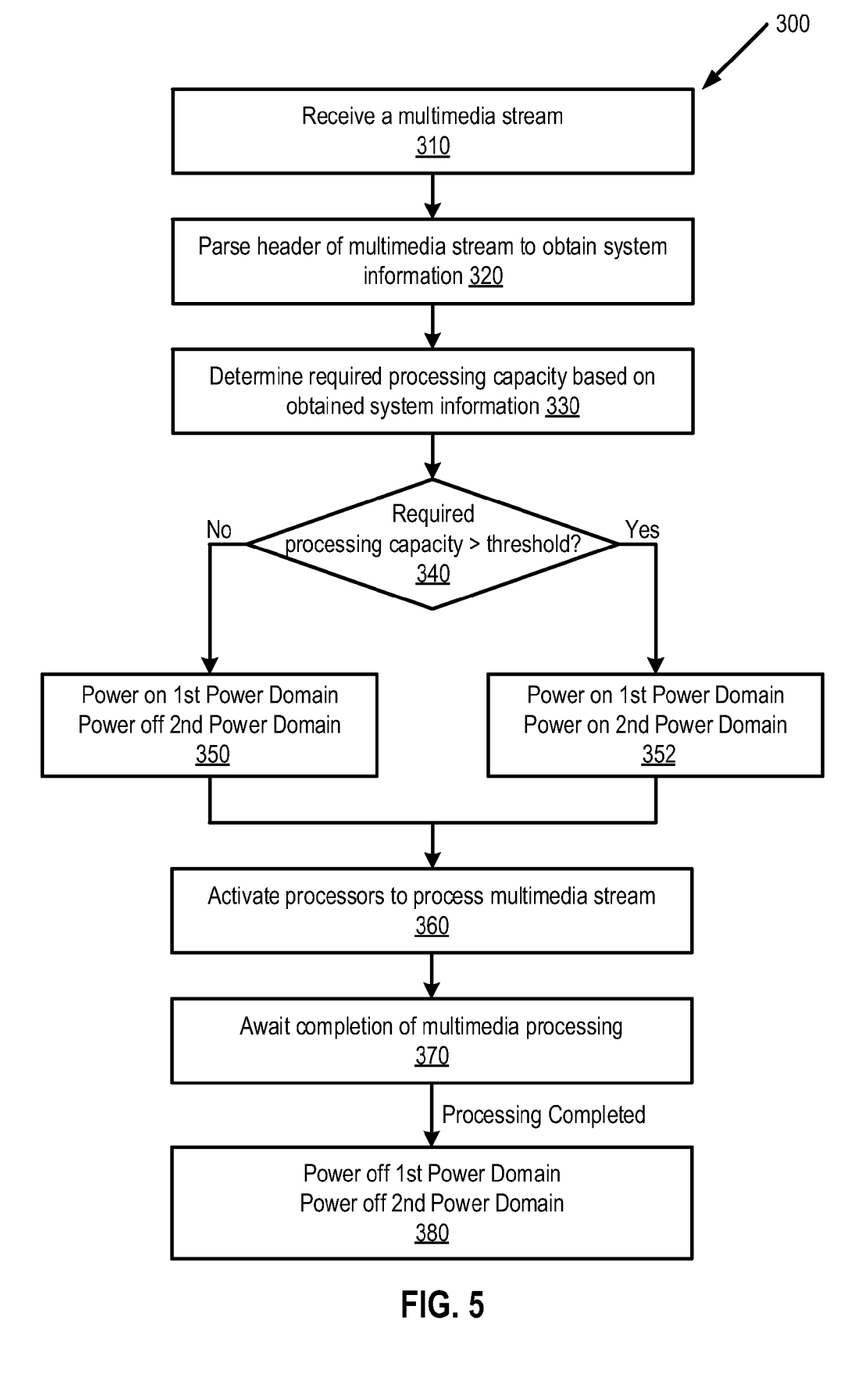
FIG. 5 is a flow diagram illustrating a power management method for processing a multimedia stream according to one embodiment.

Another embodiment of a power management method 300 is illustrated in the flow diagram of FIG. 5. In step 310, a multimedia stream is received for processing. The header of this multimedia stream is parsed at step 320 so as to obtain system information for processing the multimedia stream. The system information may comprise multimedia processing information, and may be used at step 330 to determine a required processing capacity for processing the multimedia stream. At step 340, the required processing capacity is compared with a threshold, which, in this example, may be a pre-determined processing capacity such as the processing capacity of the core(s) in a first power domain.

If the required processing capacity is greater than the threshold, this serves as an indication that a relatively higher level of power should be maintained for the proper execution of the multimedia process. Thus, power may be supplied to both the first power domain and a second power domain at step 352. If, on the other hand, the required processing capacity is not greater than the threshold, this indicates that relatively less power may be required for the proper execution of the multimedia process. Hence, an instruction is sent (e.g., by the system controller 180 of FIG. 3) to shut off power to one or more of the power domains. As exemplified in step 350, power supply may be maintained or supplied to a first power domain, while cut off to a second power domain. By activating or de-activating one or more power domains based on the system information in the header, the capacity of the multimedia processor system may be matched to a workload for processing the multimedia stream. Thus, performing such adjustments to the on- and off-statuses of the power domains may provide the necessary power for effectively performing the multimedia process, while avoiding unnecessary waste of excessive power.

At step 360, processors may be activated to process the multimedia stream. After awaiting completion of the multimedia processing at step 370, power to all power domains may be shut off at step 380. As an option, it may be desirable in certain instances to repeat selected power management steps. For example, before or during steps 360 or 370, the system may return to step 320, 330 or 340. New system information may be obtained upon returning to step 320, or a new required processing capacity may be determined upon returning to step 330. Upon repeating step 340, a new comparison result may be found, either based on a new required processing capacity, a new threshold being used for the comparison, or both.

Figure 6:
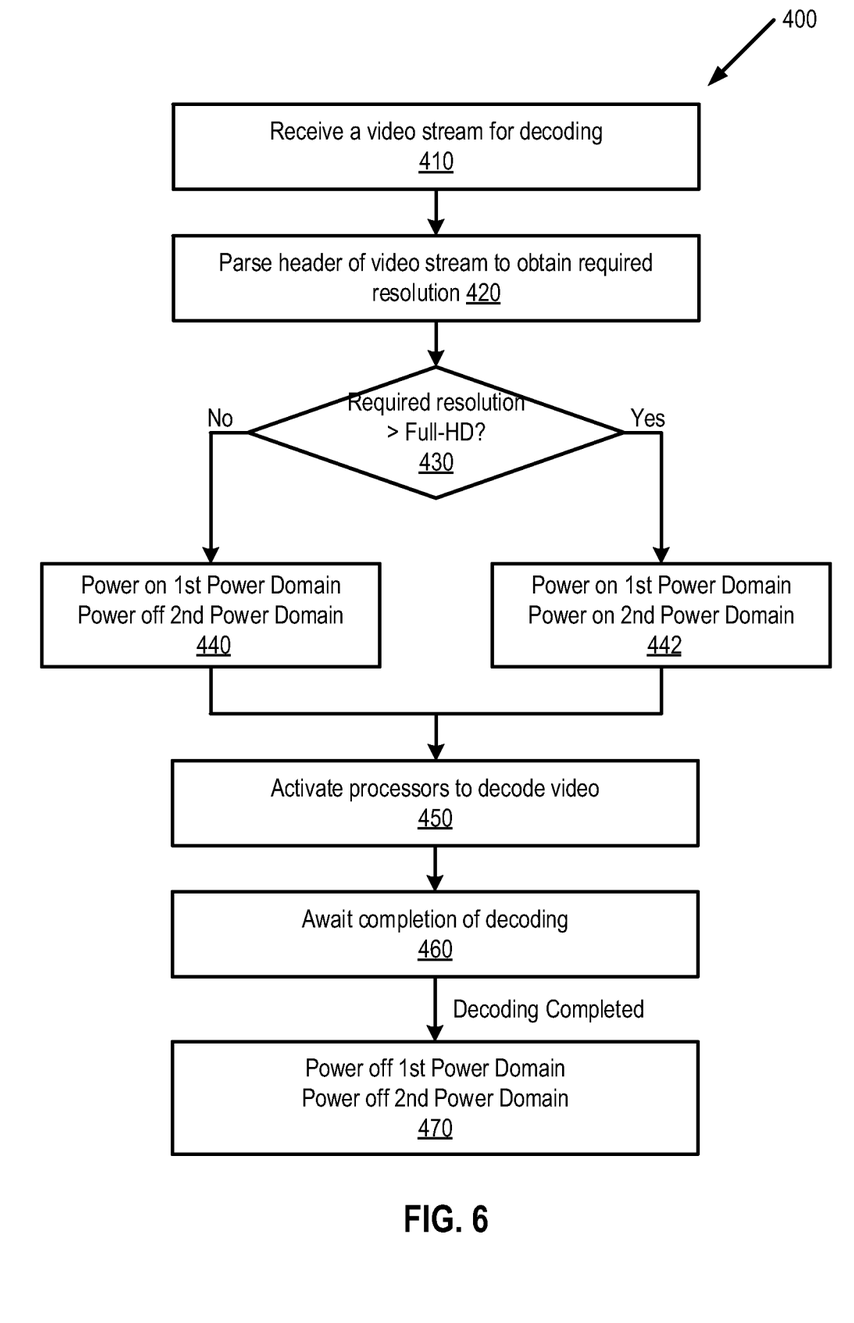
FIG. 6 is a flow diagram illustrating a power management method for decoding a video stream according to one embodiment.

FIG. 6 illustrates an embodiment of a power management method 400 for video decoding. After receiving a multimedia stream at step 410 for decoding, such as a video stream, the header of the video stream may be parsed to obtain the required resolution of the video stream at step 420. The required resolution may then be compared to a pre-determined resolution, such as full-HD resolution, at step 430. If it is determined that the required resolution is above the pre-determined resolution, power may be supplied to both power domains at step 442. Otherwise, power supply to one of the power domains (e.g., the second power domain) may be shut off at step 440, as in this example it is assumed that the processing capacity provided by the core(s) in the first power domain is sufficient for processing at the full-HD resolution but not at a higher resolution. The video decoding processors may then be activated at step 450, and once video decoding is completed at step 460, power may be shut off to both power domains at step 470.

Each of methods 200, 300 and 400 may be performed by hardware (e.g., circuitry, dedicated logic, programmable logic, microcode, etc.), software (e.g., instructions run on a processing device), or a combination thereof. In one embodiment, each of methods 200, 300 and 400 is performed by the system 100 of FIG. 3. Although only two power domains are shown and described in the embodiments of FIG. 5 and FIG. 6, it is understood that methods 300 and 400 can be readily generalized to more than two power domains. For example, the threshold at step 340 of FIG. 5 and the full-HD resolution at step 430 of FIG. 6 may be pre-determined based on or correspond to the processing capability of a set of power domains that includes more than one power domain. If the required processing capability or the required resolution is greater than the processing capability provided by the set of power domains, additional power domain(s) may be activated.

Alternatively or additionally, other types of multimedia streams may be received, and other types of system information may be used to determine the power control decisions. Referring to FIG. 4, and using two power domains as an example, power management method 200 may further comprise receiving video data, and parsing the header of the video data to obtain a video frame rate. The frame rate may then be compared to a pre-determined rate supported by the core(s) of one power domain. If it is determined that the frame rate is above the pre-determined rate, power may be supplied to both power domains. Otherwise, power supply to one of the power domains may be shut off. Power management method 200 may further comprise detecting a bit rate from parsed header information of a received multimedia stream such as audio data or other type of multimedia data, and comparing the detected bit rate with a pre-determined bit rate in order to make power control determinations with respect to the activation and deactivation of power domains.

As a further example, the header of a received video stream may be parsed to obtain a video processing standard of the video stream. The video processing standard may comprise a video codec, such as but not limited to MPEG, MPEG-4, H.264/MPEG-4 AVC, HEVC/H.265, VP8 or VP9. Based on the video processing standard of the video stream, one or more of the power domains may be activated or de-activated to match the processing capacity of the multimedia processor system to a workload for processing the video stream.

If the multimedia stream is an audio stream, the header of an audio stream may include a compression standard, such as but not limited to, Advanced Audio Coding (AAC), MPEG Audio, AC3, MP3, Dolby® or Windows® Media Audio. The audio data header may alternatively or additionally include a sample rate, such as but not limited to 44.1 KHz or 48 KHz. In one embodiment, the aforementioned system information 190 of FIG. 3 may include such standard and sample rate, as well as other various information, in the header of an audio stream. The header of an audio stream may be parsed to identify the required compression standard or sample rate, and based on such header information, one or more of the power domains may be activated or de-activated, such that the processing capacity of the multimedia processor system can match the workload of processing the audio stream. Although for simplicity the operations on audio streams are not illustrated in a figure, it is understood that the power management methods described hereinafter also apply to audio streams.

In yet another embodiment, power management method 200 may further comprise estimating a processing time for the multimedia process. The estimated processing time may be compared with a timing budget. If the estimated processing time is determined to be less than the timing budget, power may not be supplied to all power domains, or at least one of the power domains may be turned off to match the processing capacity of the multiprocessing system to the multimedia process according to real-time tolerance. A determination that the estimated processing time is less than the timing budget may, for example, indicate a processing duration that may be faster than desired or necessary. Thus, there may exist a margin for reducing the processing time in order to reduce power usage. If, however, it is determined that the estimated processing time is not less than the timing budget, power may be supplied to more or all power domains. In one embodiment, the estimation of processing time and comparison with a timing budget may be performed on an ongoing basis, and may result in changes as to whether power is supplied to one or more power domains.

Similar to the examples of FIG. 5 and FIG. 6, the embodiments in connection with frame rate, bit rate, video processing standard and processing time are readily generalized to any number of power domains. For example, the pre-determined frame rate, bit rate, video processing standard, timing budget may be pre-determined based on or correspond to the processing capability of a set of power domains that includes one or more power domains. If the frame rate, bit rate, video processing standard, or processing time indicated in the header of a received multimedia stream is greater than the processing capability provided by the set of power domains, additional power domain(s) may be activated.

Power management method 200 may alternatively or additionally include obtaining a sensor measurement from the system information that pertains to an operating condition of the multimedia processor system. The sensor measurement may include at least one of power, current and temperature of the multimedia processor system. In response to a determination that the sensor measurement exceeds a threshold for maintaining a suitable operating condition for the multimedia processor system, power may be turned off to at least one of the power domains. The reduction of power usage may, for example, alleviate or prevent over-heating in some instances.

The system information may also alternatively or additionally include a hardware configuration, status or other data related to chip bonding. The chip bonding information enables the identification of a product segment to which the multimedia processor system belongs. As an example, the chip bonding information may indicate either a high-end product or a low-end product. Depending on the determined product segment, one or more of the power domains may be activated or de-activated.

In describing the some of the method embodiments, FIG. 4 has been used as a reference, but it should be understood that the described embodiments may perform operations different than those shown in FIG. 4. In addition, while the flow diagrams of FIGS. 4-6 show particular orders of operations performed by certain embodiments of the invention, it should be understood that such order is exemplary (e.g., alternative embodiments may perform the operations in a different order, combine certain operations, overlap certain operations, etc.).

Referring again to FIG. 3, system 100 with two power domains 120 and 130 with one core 112/114 in each power domain is shown. In alternative embodiments as will be illustrated and described below in connection with FIGS. 7-12, different configurations of the cores and power domains may be employed. Although FIGS. 7-12 illustrates a quad-core multimedia processor system as an example, it is understood that the multimedia processor system may include any number of cores and any number of power domains.

Figure 7:
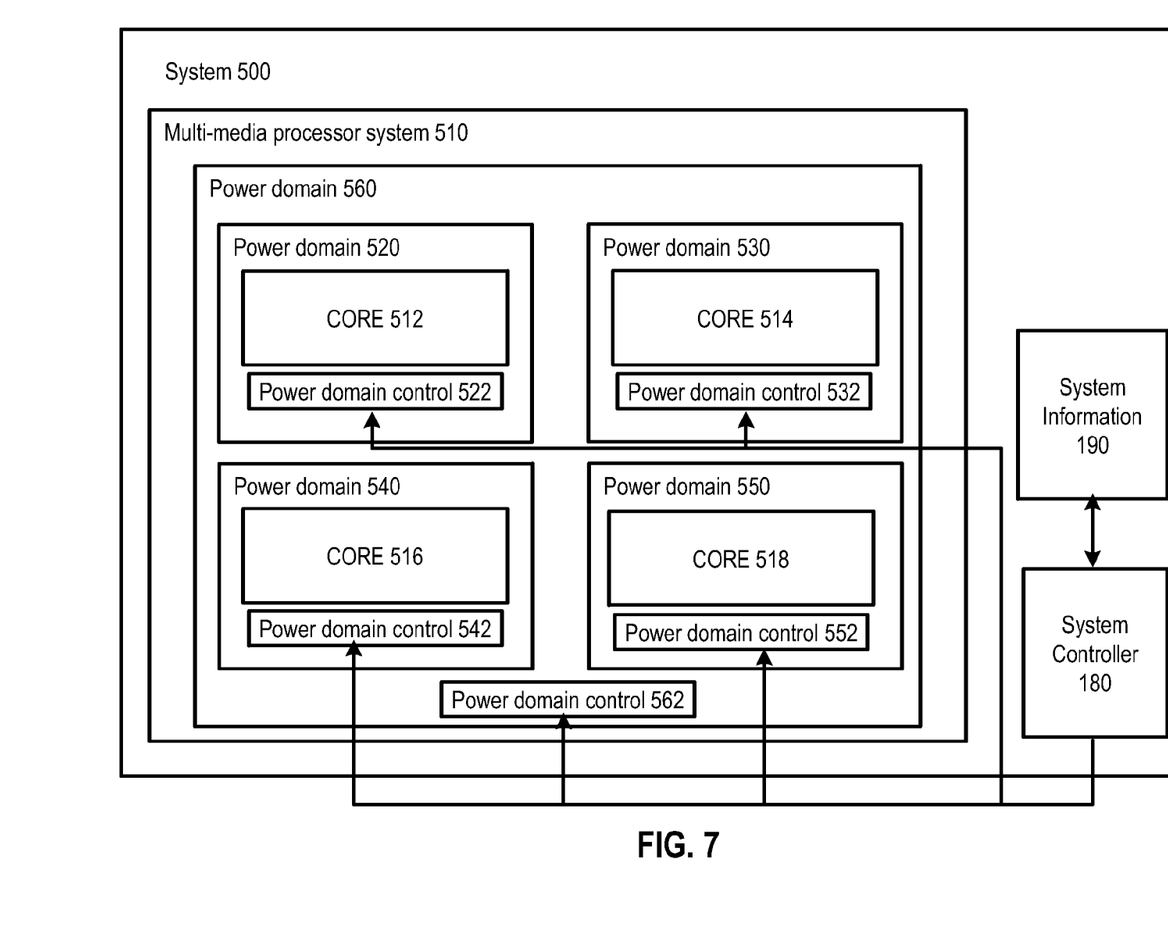
FIG. 7 illustrates a quad-core system providing power management according to one embodiment.

FIG. 7 shows system 500 according to another embodiment of the invention. System 500 includes a quad-core multimedia processor system 510 and system controller 180. In this embodiment, each of the four cores 512, 514, 516, and 518 belongs to both its own individual power domain 520, 530, 540, and 550 respectively, as well as an overall power domain 560. Thus, where N represents the total number of cores in a processor, and $M_i$ represents the number of cores within power domain i, in this embodiment N=4, $M_{520}=M_{530}=M_{540}=M_{550}=1$, and $M_{560}=4$.

Each of the power domains 520, 530, 540, 550 and 560 has its power supply controlled via power domain controls 522, 532, 542, 552 and 562 respectively, which may each comprise a switch to activate and de-activate power supply. System controller 180 determines which power domains should be on or off, according to system information 190. The system information 190 may be received from outside system 500 or accessed from within system 500.

System 500 may be configured such that when the overall power domain control 562 is switched off, the entire multimedia processor system 510 including all four cores 512, 514, 516, and 518 are switched off, regardless of whether the individual power domain controls 522, 532, 542, and 552 are switched on or off. In such a case, a core 512/514/516/518 may be turned off by turning off either its respective individual power domain 520/530/540/550 or the overall power domain 560. Alternatively, system 500 may be configured such that if either an individual power domain 520/530/540/550 or the overall power domain 560 is on, the corresponding core 512/514/516/518 may be turned on.

Figure 8:
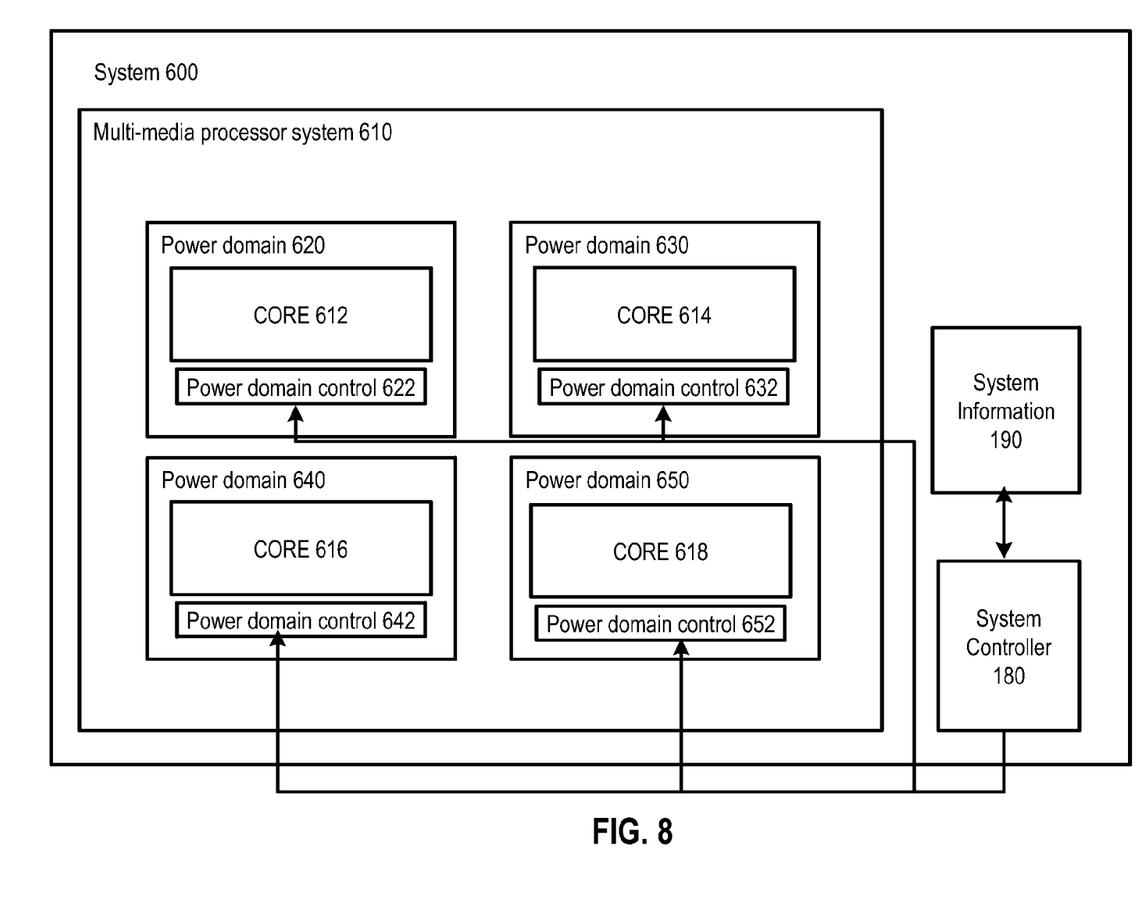
FIG. 8 illustrates a quad-core system providing power management according to another embodiment.

Various other alternative power domain configurations may be used, such as but not limited to those illustrated in FIGS. 8-12. In FIG. 8, a system 600 is shown with multimedia processor system 610. In this embodiment, each of the four cores 612, 614, 616, and 618 belongs to its own independently controlled power domain 620, 630, 640, and 650 respectively, which may be switched on or off via power domain controls 622, 632, 642, and 652. Each power domain 620, 630, 640, and 650 in system 600 in this example controls only a single core, and thus in this example $M_{620}=M_{630}=M_{640}=M_{650}=1$.

Figure 9:
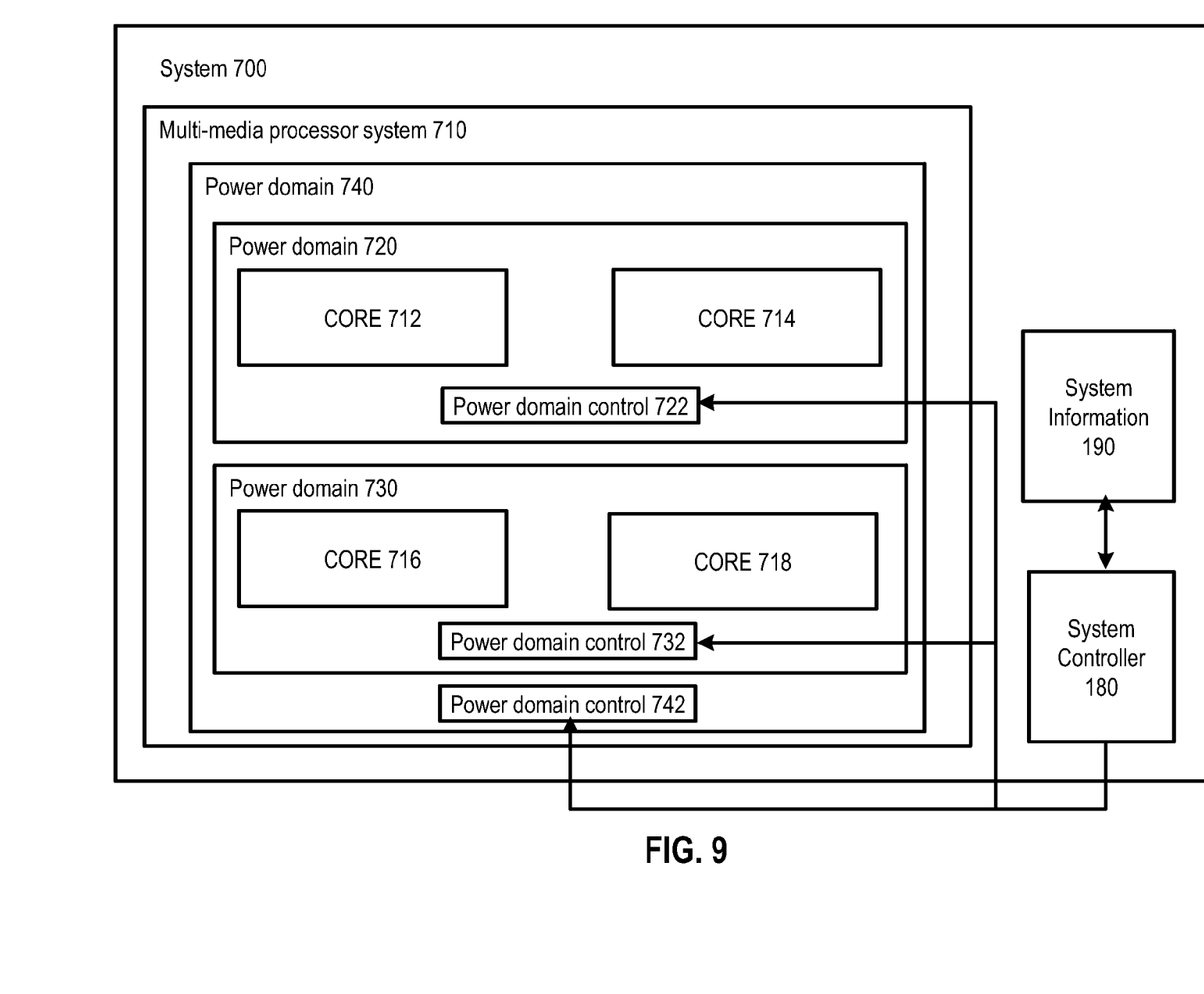
FIG. 9 illustrates a system, having multiple cores within each power domain, providing power management according to one embodiment.

FIG. 9 shows yet another embodiment of the invention. System 700 includes a multimedia processor system 710 with four cores 712, 714, 716, and 718. Cores 712 and 714 belong to power domain 720, and cores 716 and 718 belong to power domain 730. In addition, all four cores 712, 714, 716, and 718 are placed within an overall power domain 740. Thus, in this embodiment, $M_{720}=M_{730}=2$ and $M_{740}=4$. Power domains 720, 730, and 740 can be controlled independently of each other, and via power domain controls 722, 732, and 742. The system 700 may be configured such that turning off either the overall power domain 740 or one of the power domains 720 and 730 may shut off power to the cores within the respective shut-off power domains.

Figure 10:
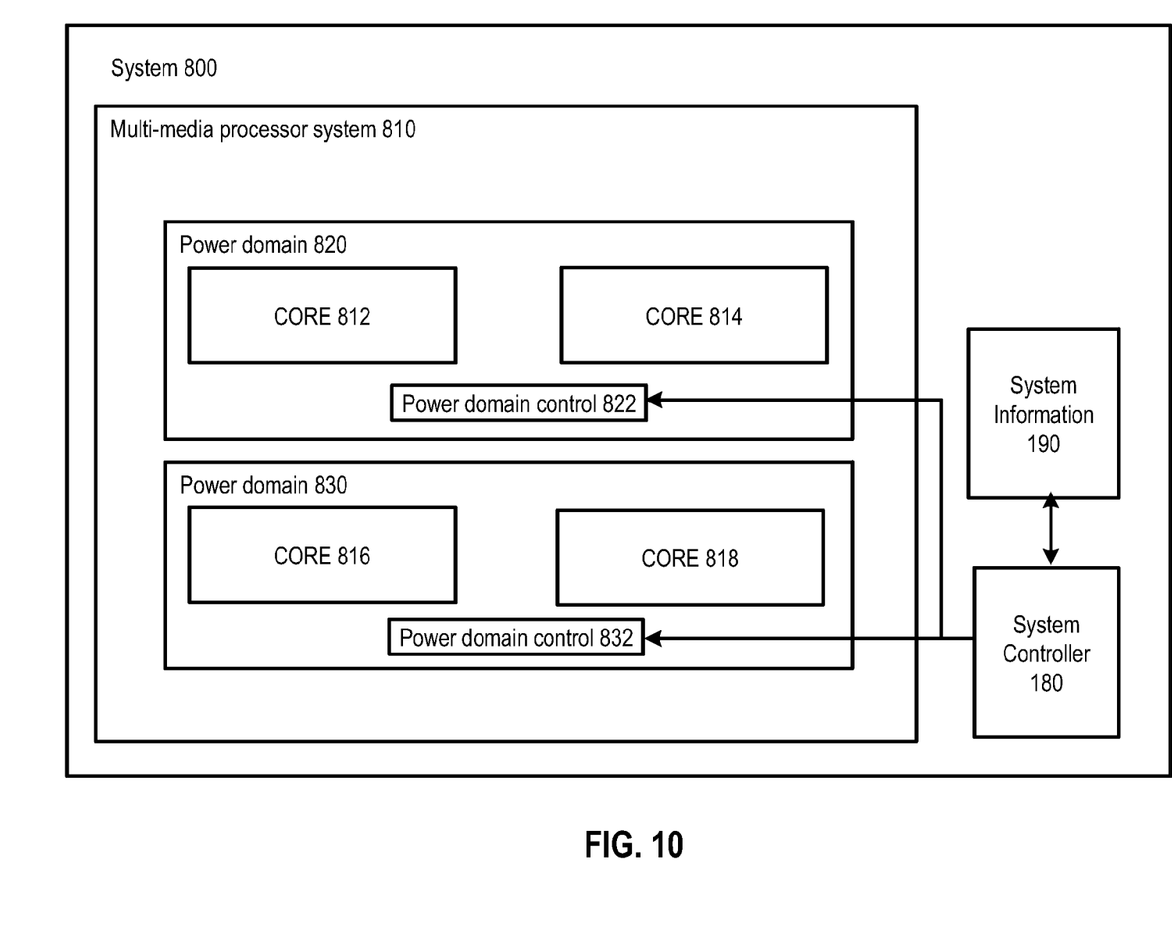
FIG. 10 illustrates a system, having multiple cores within each power domain, providing power management according to another embodiment.

In FIG. 10, system 800 is shown with multimedia processor system 810 having four cores 812, 814, 816 and 818. Power domain 820 includes cores 812 and 814, while power domain 830 includes 816 and 818. The two power domains 820 and 830 can independently control power supply to their respective cores, via power domain controls 822 and 832 respectively. $M_{820}=M_{830}=2$ in this embodiment.

Figure 11:
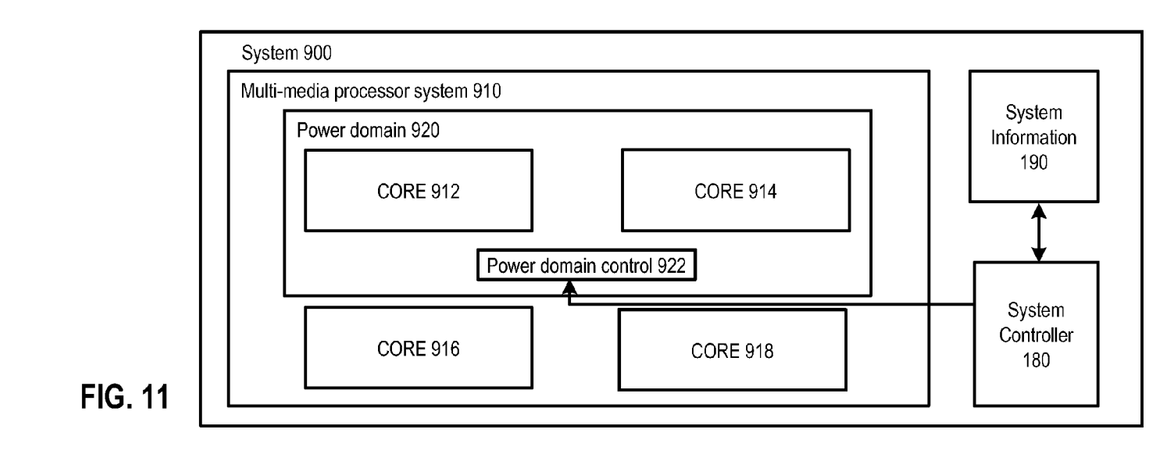
FIG. 11 illustrates a system, having at least one core not within a power domain, providing power management according to one embodiment.
Figure 12:
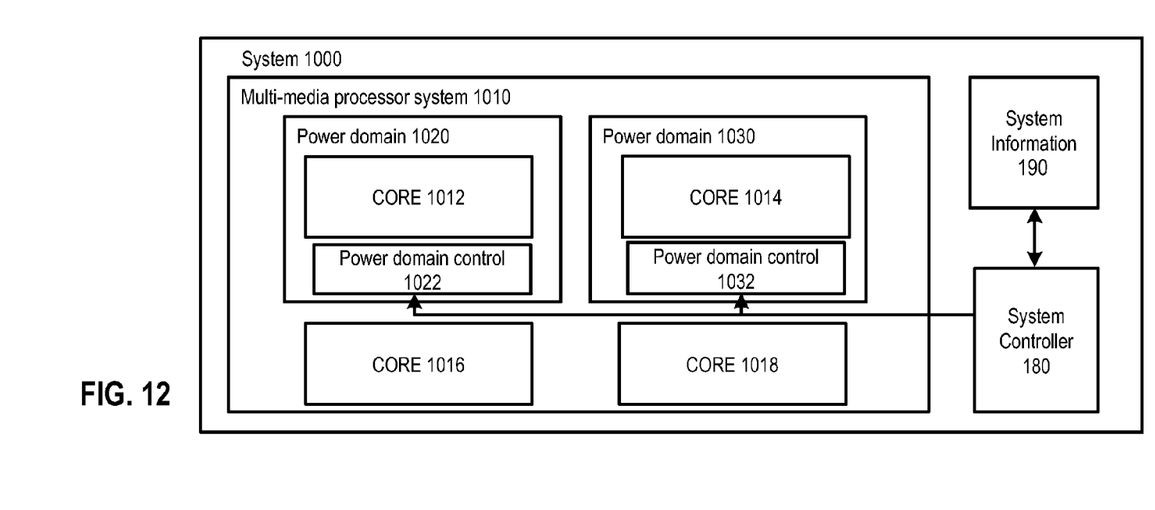
FIG. 12 illustrates a system, having at least one core not within a power domain, providing power management according to another embodiment.

FIGS. 11 and 12 illustrate embodiments of systems in which at least one core does not belong to a power domain. In FIG. 11, a system 900 includes a multimedia processor system 910, with cores 912, 914, 916, and 918. While cores 912 and 914 can be controlled within power domain 920 via power domain control 922, cores 916 and 918 do not belong to any power domain, and may be configured to remain powered on. Here, $M_{920}=2$. In FIG. 12, a system 1000 includes a multimedia processor system 1010, which further includes cores 1012, 1014, 1016, and 1018. While cores 1012 and 1014 can be controlled within power domains 1020 and 1030 via power domain controls 1022 and 1032 respectively, cores 1016 and 1018 do not belong to any power domain, and may be configured to remain powered on. Here, $M_{1020}=M_{1030}=1$.

Figure 13:
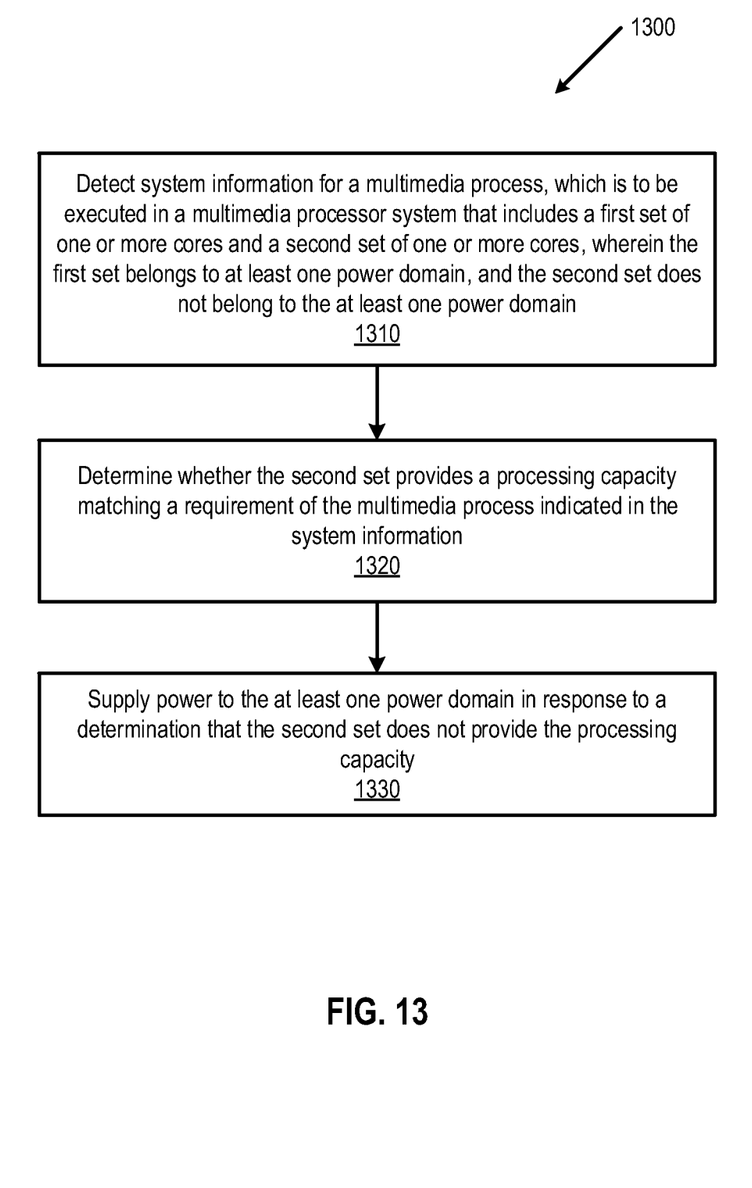
FIG. 13 is a flow diagram illustrating a power management method for multimedia processing according to another embodiment.

FIG. 13 illustrates an embodiment of a method 1300 of power management for multimedia processing to be executed in a multimedia processor system that includes a first set of one or more cores and a second set of one or more cores. The first set belongs to at least one power domain, and the second set does not belong to the at least one power domain. At step 1310, system information for a multimedia process is detected. It is then determined at step 1320 whether the second set provides a processing capacity matching a requirement of the multimedia process indicated in the system information. At step 1330, power may be supplied to the at least one power domain in response to a determination that the second set does not provide the processing capacity. In some embodiments, the method 1300 of FIG. 13 may be performed by the embodiments referenced in FIG. 11 and FIG. 12.

It should be understood that the earlier descriptions herein referencing FIG. 3 may be similarly applicable to the system embodiments of FIGS. 7-12. Likewise, the above descriptions referencing FIGS. 7-12 may also be applicable to the embodiment of FIG. 3. Generally, the descriptions herein that reference a particular embodiment may be applicable to other embodiments within the spirit of the invention. In addition, the concepts of the invention may be implemented with various numbers and configurations of processor cores, and are not limited to those shown in the drawings.

In determining the number and configuration of cores to be placed within each power domain, various factors may be considered. As an example, depending on the types of scenarios in which the end product may be used, a design-time decision may be made with regard to the level of control desired. If, for example, it is determined that the product would benefit from a high level of fine-grained power control, each core may have its own power domain. If a relatively lower level of fine-grain power control is desired, more cores may be placed within a single power domain. In addition, a system may comprise different types of cores. In such a case, a single power domain may be limited to one or more cores of a single type, or alternatively, may include different types of cores grouped together.

The various embodiments of the power domain control (e.g., power domain control 122 or 132 of FIG. 3 and corresponding power domain controls in FIGS. 7-12) may be implemented using a MTCMOS circuitry in one embodiment. The MTCMOS circuitry may include a power switch for turning on and off power supply. An isolation cell may be utilized when deactivating a power domain, to maintain a steady state between an output of the de-activated core(s) and a still-active core(s), so as to avoid interfering with the operation of the active core(s). One or more data retention flip-flops, or retention registers, may be employed to preserve the state of a core upon it being powered down. One or more always-on buffers may be utilized to feed signals through a powered-off power domain.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of power management for multimedia processing comprising:

detecting system information at least in part from a multimedia stream, the system information including a required characteristic of a multimedia output to be generated by a multimedia processor system that includes a plurality of power domains, wherein the power domains are controlled independently of one another, and each power domain includes one or more of cores having a same functionality for processing multimedia streams;

identifying an additional set of the power domains, which, in combination with a given set of the power domains being currently powered on, provides an increased processing capacity for generating the multimedia output with the required characteristic; and supplying power to the identified set of the power domains to generate the multimedia output with the required characteristic.

2. The method of claim 1, wherein the system information includes at least one of: resolution, frame rate, bit rate, video processing standard, audio sample rate, audio compression standard, estimated processing time, sensor measurements, power measurements, current measurements and chip bonding information.

3. The method of claim 1, further comprising:
receiving the multimedia stream for processing;
parsing a header of the multimedia stream to obtain the system information for processing the multimedia stream;
activating or de-activating at least one of the power domains according to the obtained system information.

4. The method of claim 1, wherein the multimedia stream comprises video data and the required characteristic comprises a required resolution of output video data, the method further comprising:
de-activating the at least one of the power domains if the required resolution is not greater than a pre-determined resolution.

5. The method of claim 1, wherein the multimedia stream comprises video data and the required characteristic comprises a required frame rate of output video data, the method further comprising:
de-activating the at least one of the power domains if the required frame rate is not greater than a pre-determined frame rate.

6. The method of claim 1, wherein the multimedia stream comprises audio data and the required characteristic comprises a required bit rate of output audio data, the method further comprising:
de-activating the at least one of the power domains if the required bit rate is not greater than a pre-determined bit rate.

7. The method of claim 1, wherein the multimedia stream comprises at least one of video data and audio data, and the required characteristic comprises at least one of a video standard for processing the video data and an audio compression standard for processing the audio data, the method further comprising:
activating or de-activating the at least one of the power domains based on a workload incurred by processing in accordance with the at least one of the video processing standard and the audio compression standard.

8. The method of claim 1, further comprising:
estimating a processing time for the multimedia process;
comparing the estimated processing time with a timing budget; and in response to a determination that the estimated processing time is less than the timing budget, de-activating at least one of the power domains.

9. The method of claim 1, further comprising:
obtaining a sensor measurement from the system information, the sensor measurement including at least one of power, current and temperature of the multiprocessing system; and
in response to a determination that the sensor measurement exceeds a threshold for performing the multimedia process, de-activating at least one of the power domains.

10. The method of claim 1, further comprising:
identifying a product segment to which the multimedia processor system belongs based on the system information, wherein the system information includes chip bonding information; and
activating or de-activating the one or more of the power domains in response to the determined product segment.

11. The method of claim 1, wherein each of the power domains includes a multi-threshold CMOS (MTCMOS) circuitry that further includes a power switch for power gating.

12. The method of claim 1, wherein at least one of the cores belongs to both a first power domain and a second power domain, the method further comprising:
de-activating the at least one core by de-activating either one of the first power domain and the second power domain.

13. A system that manages power for multimedia processing, the system comprising:
a multimedia processor system that includes a plurality of power domains, wherein the power domains are controlled independently of one another, and each power domain includes one or more of cores having a same functionality for processing multimedia streams;
power domain controls, each of which controls one of the power domains; and
a system controller coupled to the multimedia processor system, the system controller operative to:
detect system information at least in part from a multimedia stream, the system information including a required characteristic of a multimedia output to be generated by the multimedia processor system;
identify an additional set of the power domains, which, in combination with a given set of the power domains being currently powered on, provides an increased processing capacity for generating the multimedia output with the required characteristic; and
direct the power domain controls to supply power to the identified set of the power domains to generate the multimedia output with the required characteristic.

14. The system of claim 13, wherein the power domains include an overall power domain which further includes all cores of the multimedia processor system, and one or more additional power domains each of which further includes one or more of the cores.

15. The system of claim 13, wherein at least one of the cores does not belong to any of the power domains and wherein each of the power domains includes one or more cores.

16. The system of claim 13, wherein each power domain control includes a multi-threshold CMOS (MTCMOS) circuitry that further includes a power switch for power gating.

17. The system of claim 13, wherein the system information includes at least one of: resolution, frame rate, bit rate, video processing standard, audio sample rate, audio compression standard, estimated processing time, temperature measurements, power measurements, current measurements and chip bonding information.

18. The system of claim 13, wherein the system controller is further operative to:
receive the multimedia stream for processing;
parse a header of the multimedia stream to obtain the system information for processing the multimedia stream, wherein the system information comprises at least one of: resolution, frame rate, bit rate, video processing standard, audio compression standard, audio sample rate; and
de-activating at least one of the power domains if a requirement indicated in the system information is not greater than a pre-determined threshold.

19. The system of claim 13, wherein the system controller is further operative to:
estimate a processing time for the multimedia process;
compare the estimated processing time with a timing budget; and
in response to a determination that the estimated processing time is less than the timing budget, de-activate at least one of the power domains.

20. The system of claim 13, wherein the system controller is further operative to:
obtain a sensor measurement from the system information, the sensor measurement including at least one of power, current and temperature of the multiprocessing system; and
in response to a determination that the sensor measurement exceeds a threshold for performing the multimedia process, de-activate at least one of the power domains.

21. A method of power management for multimedia processing comprising:
detecting system information at least in part from a multimedia stream, the system information including a required characteristic of a multimedia output to be generated by a multimedia processor system that includes a first set of one or more cores and a second set of one or more cores, wherein the first set belongs to at least one power domain, and the second set is powered on and does not belong to the at least one power domain, and the cores in the first set and the second set have a same functionality for processing multimedia streams;
determining whether the second set provides a processing capacity for generating the multimedia output with the required characteristic; and
supplying power to the first set in the at least one power domain in response to a determination that the second set does not provide the processing capacity such that the first set in combination with the second set generate the multimedia output with the required characteristic.

22. A system that manages power for multimedia processing, the system comprising:
a multimedia processor system that includes a first set of one or more cores and a second set of one or more cores, wherein the first set belongs to at least one power domain, and the second set is powered on and does not belong to the at least one power domain, and the cores in the first set and the second set have a same functionality for processing multimedia streams;
at least one power domain control which controls the at least one power domain; and
a system controller coupled to the multimedia processor system, the system controller operative to:
detect system information at least in part from a multimedia stream, the system information including a required characteristic of a multimedia output to be generated by the multimedia processor system;
determine whether the second set provides a processing capacity for generating the multimedia output with the required characteristic; and
direct the at least one power domain control to supply power to the first set in the at least one power domain in response to a determination that the second set does not provide the processing capacity such that the first set in combination with the second set generate the multimedia output with the required characteristic.

\* \* \* \* \*